(12) United States Patent
Wu et al.

(10) Patent No.: US 11,245,165 B2
(45) Date of Patent: Feb. 8, 2022

(54) LIQUID CRYSTAL PHASE SHIFTING DEVICE, MANUFACTURING METHOD THEREFOR, LIQUID CRYSTAL PHASE SHIFTER, AND ANTENNA

(71) Applicant: Chengdu Tianma Micro-Electronics Co., Ltd., Chengdu (CN)

(72) Inventors: Bo Wu, Chengdu (CN); Yingru Hu, Chengdu (CN); Dongquan Hou, Chengdu (CN); Peng Li, Shanghai (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 0 days.

(21) Appl. No.: 16/958,710

(22) PCT Filed: May 21, 2019

(86) PCT No.: PCT/CN2019/087732
§ 371 (c)(1),
(2) Date: Jun. 28, 2020

(87) PCT Pub. No.: WO2019/223675
PCT Pub. Date: Nov. 28, 2019

(65) Prior Publication Data
US 2021/0083350 A1    Mar. 18, 2021

(30) Foreign Application Priority Data
May 23, 2018    (CN) .......................... 201810501916.3

(51) Int. Cl.
*H01P 1/18*    (2006.01)
*G02F 1/1333*    (2006.01)
(Continued)

(52) U.S. Cl.
CPC .......... *H01P 1/184* (2013.01); *G02F 1/13439* (2013.01); *G02F 1/13731* (2013.01); *G02F 1/133305* (2013.01)

(58) Field of Classification Search
CPC ................. H01P 1/184; G02F 1/13731; G02F 1/133305; G02F 1/13439
See application file for complete search history.

(56) References Cited

U.S. PATENT DOCUMENTS 9,835,924 B1    12/2017 Lee et al.
2014/0022029 A1*  1/2014 Glushchenko ......... B82Y 20/00
                                                   333/161

FOREIGN PATENT DOCUMENTS

CN    103913880 A  *  7/2014    .......... G02F 1/1334
CN    103913880 A     7/2014
(Continued)

OTHER PUBLICATIONS

Office Action of Chinese Patent Application No. 201810501916.3 dated Oct. 20, 2020.

*Primary Examiner* — Donald L Raleigh
(74) *Attorney, Agent, or Firm* — Kilpatrick Townsend & Stockton, LLP

(57) ABSTRACT

The present disclosure provides a liquid crystal phase shifting device, a manufacturing method for the liquid crystal phase shifting device, a liquid crystal phase shifter, and an antenna, aiming to achieve the better curved surface applications of the liquid crystal phase shifting device and thus increases the applications. The liquid crystal phase shifting device includes: a first flexible substrate and a second flexible substrate that are opposite to each other; a microstrip line arranged on a side of the first flexible substrate facing towards the second flexible substrate; an electrode layer arranged on a side of the second flexible substrate facing towards the first flexible substrate; and solid-state liquid (Continued)

crystal arranged between the microstrip line and the electrode layer. The liquid crystal phase shifting device is used for performing phase shifting on a microwave signal.

20 Claims, 5 Drawing Sheets

(51) Int. Cl.
  *G02F 1/1343* (2006.01)
  *G02F 1/137* (2006.01)

(56) References Cited

FOREIGN PATENT DOCUMENTS

| | | | | |
|---|---|---|---|---|
| CN | 103975483 | A | 8/2014 | |
| CN | 107453013 | A | 12/2017 | |
| CN | 107797342 | A | 3/2018 | |
| CN | 109212810 | A | 1/2019 | |
| JP | 2002330006 | A * | 11/2002 | ............... H01P 3/08 |
| JP | 2002330006 | A | 11/2002 | |
| JP | 2009003427 | A | 1/2009 | |
| JP | 4245823 | B2 | 4/2009 | |

* cited by examiner

LIQUID CRYSTAL PHASE SHIFTING DEVICE, MANUFACTURING METHOD THEREFOR, LIQUID CRYSTAL PHASE SHIFTER, AND ANTENNA

CROSS-REFERENCE TO RELATED APPLICATIONS

The present application is a U.S. National Stage of International Application No. PCT/CN2019/087732, filed on May 21, 2019, which claims priority to Chinese Patent Application No. 201810501916.3, filed on May 23, 2018 and titled "LIQUID CRYSTAL PHASE SHIFTING DEVICE, MANUFACTURING METHOD THEREFOR, LIQUID CRYSTAL PHASE SHIFTER, AND ANTENNA", the contents of which are incorporated herein by reference in its entirety.

FIELD

The present disclosure relates to the field of phase shifting, and in particular, to a liquid crystal phase shifting device, a manufacturing method therefor, a liquid crystal phase shifter, and an antenna.

BACKGROUND

As a device for adjusting a phase of a wave, a phase shifter has been widely applied in areas such as radar, missile attitude control, accelerator, communications, instrumentation, and even music.

The currently widely used phase shifter is a liquid crystal phase shifter, which includes a plurality of liquid crystal phase shifting devices. However, a structure of the existing liquid crystal phase shifting device may cause a high rigidity to the liquid crystal phase shifter. As a result, it is difficult to achieve a curved surface, leading to limited applications.

SUMMARY

In view of this, embodiments of the present disclosure provide a liquid crystal phase shifting device, a manufacturing method therefor, a liquid crystal phase shifter, and an antenna, aiming to achieve the better curved surface applications of the liquid crystal phase shifting device and thus increases the applications.

In one embodiment of the present disclosure provides a liquid crystal phase shifting device, including: a first flexible substrate and a second flexible substrate that are opposite to each other; a microstrip line arranged on a side of the first flexible substrate facing towards the second flexible substrate; an electrode layer arranged on a side of the second flexible substrate facing towards the first flexible substrate; and solid-state liquid crystal arranged between the microstrip line and the electrode layer.

In another embodiment of the present disclosure provides a manufacturing method for a liquid crystal phase shifting device, and the manufacturing method is applied to the liquid crystal phase shifting device described above. The manufacturing method includes steps of: forming the first flexible substrate and the second flexible substrate; forming the microstrip line on the first flexible substrate, and forming the electrode layer on the second flexible substrate; forming the solid-state liquid crystal; and bonding the solid-state liquid crystals, the first flexible substrate on which the microstrip line is arranged, and the second flexible substrate on which the electrode layer is arranged together, and the solid-state liquid crystals are in contact with both the microstrip line and the electrode layer.

In still another embodiment of the present disclosure provides a liquid crystal phase shifter including a plurality of liquid crystal phase shifting devices described above, and the plurality of liquid crystal phase shifting devices is arranged in a matrix.

In yet another embodiment of the present disclosure provides an antenna including the liquid crystal phase shifter described above.

The embodiments of the present disclosure, the liquid crystal phase shifting device includes two substrates, each of which is a flexible substrate. Therefore, compared with the liquid crystal phase shifting device having a high rigidity in the related art, the liquid crystal phase shifting device according to the present disclosure has a lower rigidity and can be folded and bent, which not only decreases a volume but also leads to the better curved surface applications. For example, the liquid crystal phase shifting device can be bent and bonded to a machine-mounted or vehicle-mounted device having a curved surface, breaking a bottleneck of the existing liquid crystal phase shifting device in the curved surface applications. In addition, the flexible substrate is very thin and light. Therefore, a thickness and a weight of an overall liquid crystal phase shifting device can be decreased, greatly alleviating a restriction on the application of the liquid crystal phase shifting device caused by the excessively large thickness and weight. According to embodiments of the present disclosure, its applications can be greatly increased based on the characteristics of a low rigidity, being foldable and bendable, a small thickness, and a small weight of the liquid crystal phase shifting device.

BRIEF DESCRIPTION OF DRAWINGS

In order to illustrate embodiments of the present disclosure, the accompanying drawings used in the embodiments or the prior art are introduced hereinafter. These drawings illustrate some embodiments of the present disclosure.

DESCRIPTION OF EMBODIMENTS

In order to better understand embodiments of the present disclosure, the embodiments of the present disclosure will be described in details with reference to the drawings.

The terms used in the embodiments of the present disclosure are merely for the purpose of describing specific embodiments, rather than limiting the present disclosure. The singular form "a", "an", "the" and "said" used in the embodiments and claims shall be interpreted as also including the plural form, unless indicated otherwise in the context.

It should be understood that, the term "and/or" is used in the present disclosure merely to describe relations between associated objects, and thus includes three types of relations. That is, A and/or B can represent: A exists alone; A and B exist at the same time; or B exists alone. In addition, the character "/" generally indicates "or".

It is to be noted that, while flexible substrates may be described using terms such as "first", "second" and "third" in the embodiments of the present disclosure, they are not limited by these terms which are used for distinguishing the flexible substrates from one another only. For example, a first flexible substrate may be referred to as a flexible substrate transistor, without departing from the scope of the embodiments of the present disclosure. Likewise, a second flexible substrate may be referred to as a first flexible substrate.

Figure 1:
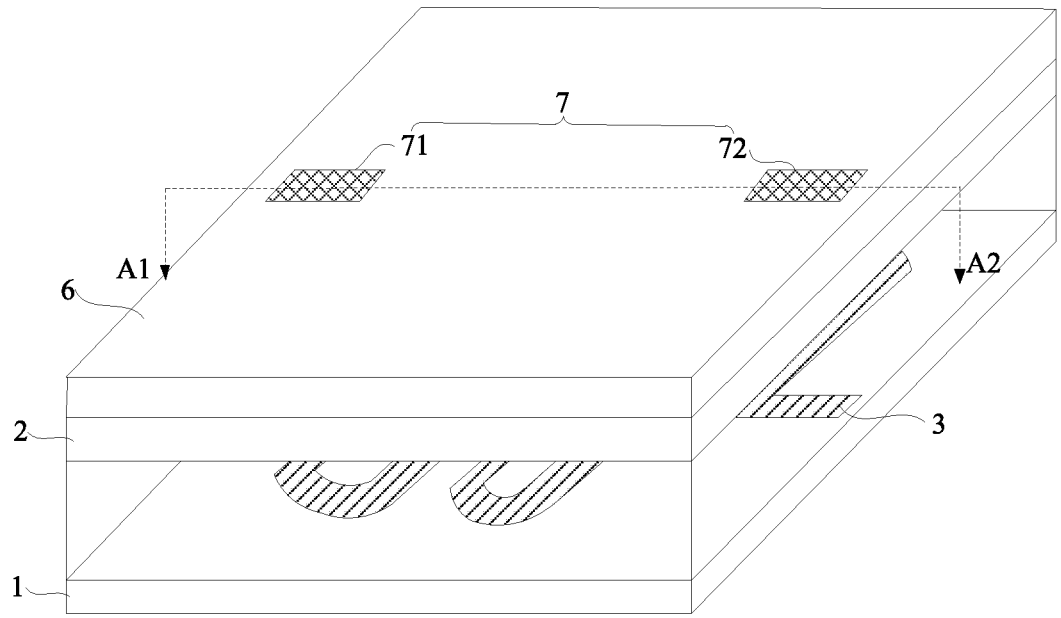
FIG. 1 is a schematic diagram of a structure of a liquid crystal phase shifting device according to an embodiment of the present disclosure.
Figure 2:
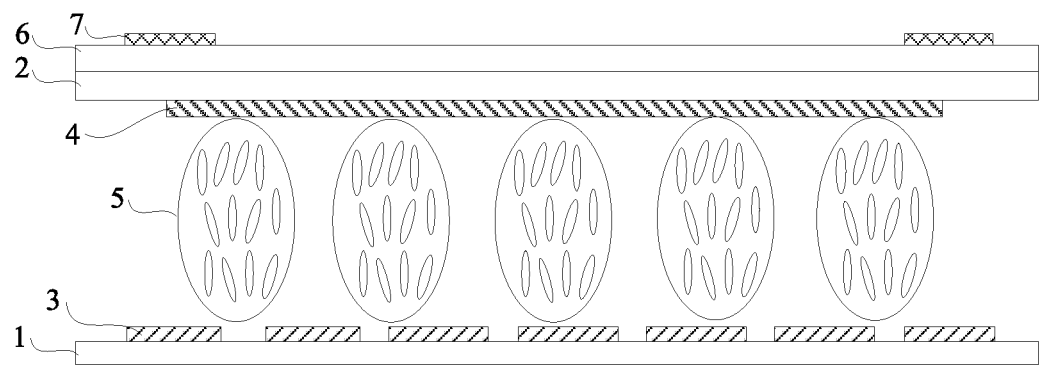
FIG. 2 is a cross-sectional view along line A1-A2 shown in FIG. 1.

The embodiments of the present disclosure provide a liquid crystal phase shifting device. FIG. 1 is a schematic diagram of a structure of a liquid crystal phase shifting device according to an embodiment of the present disclosure, and FIG. 2 is a cross-sectional view along line A1-A2 shown in FIG. 1. As shown in FIG. 1 and FIG. 2, the liquid crystal phase shifting device includes a first flexible substrate 1 and a second flexible substrate 2 that are opposite to each other. A microstrip line 3 is provided at a side of the first flexible substrate 1 facing towards the second flexible substrate 2, and an electrode layer 4 is provided at a side of the second flexible substrate 2 facing towards the first flexible substrate 1. Solid-state liquid crystals 5 are provided between the microstrip line 3 and the electrode layer 4.

It should be noted that each of the first flexible substrate 1 and the second flexible substrate 2 may be a substrate having characteristics of being stretchable, being foldable, being bendable, and being curlable, and may be made of a flexible material, such as polyimide (PI), polycarbonate (PC), polyethersulfone (PES), polyethylene terephthalate (PET), polyethylene naphthalate (PEN), polyarylate (PAR) or glass fiber reinforced plastic (FRP).

When the liquid crystal phase shifting device is used to shift a phase of a microwave signal, the microwave signal requiring for phase shifting is transmitted to the liquid crystal phase shifting device via the microstrip line 3. Then, respective voltage signals are applied to the microstrip line 3 and the electrode layer 4, and an electric field is formed between the microstrip line 3 and the electrode layer 4. Liquid crystal molecules in the solid-state liquid crystals 5 are deflected under an action of the electric field to achieve phase shifting of the microwave signal. After the phase shifting, the microwave signal is transmitted from the liquid crystal phase shifting device via the microstrip line 3.

In the liquid crystal phase shifting device according to this embodiment of the present disclosure, the two substrates each are a flexible substrate. Therefore, compared with the liquid crystal phase shifting device having a high rigidity in the related art, the liquid crystal phase shifting device in this embodiment of the present disclosure has a lower rigidity and is foldable and bendable, which not only decreases a volume but also leads to the better curved surface applications. For example, the liquid crystal phase shifting device can be bent and bonded to a machine-mounted or vehicle-mounted device having a curved surface, breaking a bottleneck of the existing liquid crystal phase shifting device in the curved surface applications. In addition, the flexible substrate is very thin and light, and thus the liquid crystal phase shifting device formed by the flexible substrate can have a reduced thickness and a reduced weight, greatly alleviating a restriction on the application of the liquid crystal phase shifting device caused by the excessively large thickness and weight. Therefore, for the liquid crystal phase shifting device according to this embodiment of the present disclosure, its applications can be greatly increased based on its characteristics such as a low rigidity, being foldable and bendable, a small thickness, and a small weight.

In addition, the liquid crystals included in the liquid crystal phase shifting device according to this embodiment of the present disclosure are solid-state liquid crystals 5. Since the solid-state liquid crystals 5 have a self-alignment characteristic, there is no need for an alignment layer for aligning the liquid crystals in the liquid crystal phase shifting device, further decreasing the thickness of the liquid crystal phase shifting device. In addition, compared with liquid-state liquid crystals, the solid-state liquid crystals 5 have no fluidity, and thus there is no need for a frame sealant for encapsulating the liquid crystals in the liquid crystal phase shifting device, simplifying a manufacturing process and decreasing manufacturing costs.

Figure 3:
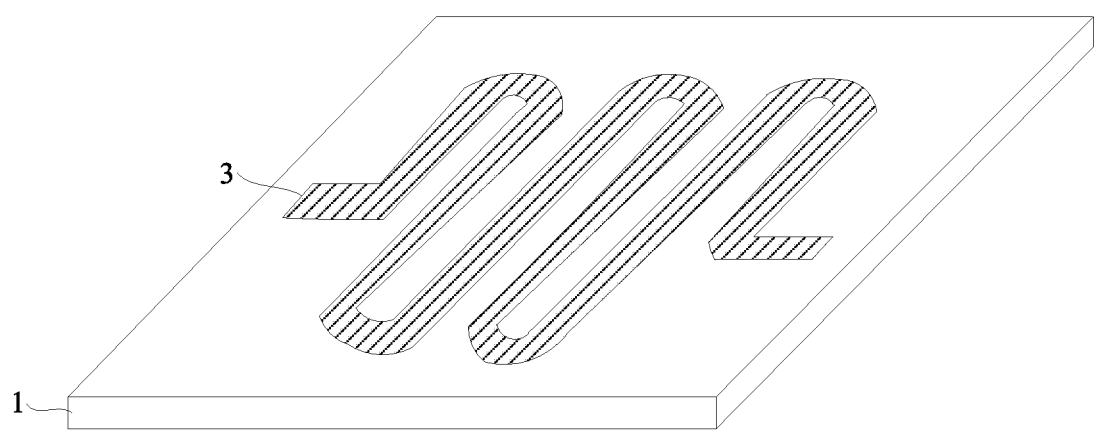
FIG. 3 is a top view of a microstrip line according to an embodiment of the present disclosure.

FIG. 3 is a top view of a microstrip line according to an embodiment of the present disclosure. In an embodiment, as shown in FIG. 3, the microstrip line 3 may have a serpentine shape. The serpentine shape of the microstrip line 3 can increase an area where the microstrip line 3 directly faces the electrode layer 4, so that as many liquid crystal molecules as possible in the solid-state liquid crystals 5 are in the electric field formed between the microstrip line 3 and the electrode layer 4. In this way, a deflection efficiency of the liquid crystal molecules can be improved.

In addition, the electrode layer 4 may be a whole metal layer, and is electrically connected to a ground signal terminal. When performing phase shifting on the microwave signal, in addition to forming an electric field together with the microstrip line 3, the electrode layer 4 can allow the microwave signal to be propagated only in the liquid crystal phase shifting device during the phase shifting. In view of this, the microwave signal can be prevented from propagating outside the liquid crystal phase shifting device. Moreover, the electrode layer 4 can also shield external signals to prevent external signals from interfering with the microwave signal, improving an accuracy in the phase shifting of the microwave signal.

In an example, the microstrip line 3 and the electrode layer 4 may be formed of one or more materials of aluminum, copper, molybdenum, and silver.

Further, with further reference to FIG. 1 and FIG. 2, the liquid crystal phase shifting device may further include a third flexible substrate 6 and a feeder line 7. The third flexible substrate 6 is arranged at a side of the second flexible substrate 2 facing away from the first flexible substrate 1, and the feeder line 7 is located at a side of the third flexible substrate 6 facing away from the second flexible substrate 2. The flexible substrate 6 also has substrate characteristics such as being stretchable, being foldable, being bendable and being curlable, and may be made of a flexible material such as polyimide (PI), polycarbonate (PC), polyethersulfone (PES), polyethylene terephthalate (PET), polyethylene naphthalate (PEN), polyarylate (PAR) or glass fiber reinforced plastic (FRP).

With further reference to FIG. 1, the feeder line 7 includes a feed-in trace segment 71 and a feed-out trace segment 72. The feed-in trace segment 71 is electrically connected to a microwave signal transmitting device (not shown), and the feed-out trace segment 72 is electrically connected to a microwave signal receiving device (not shown). In the phase shifting of the microwave signal, the feed-in trace segment 71 receives the microwave signal requiring for phase shifting, and then transmits the microwave signal to the microstrip line 3. After the phase shifting is completed, the feed-out trace segment 72 receives the microwave signal emitted from the microstrip line 3 and then transmits the microwave signal.

In an example, the solid-state liquid crystals 5 include at least one solid-state liquid crystal film.

Figure 4:
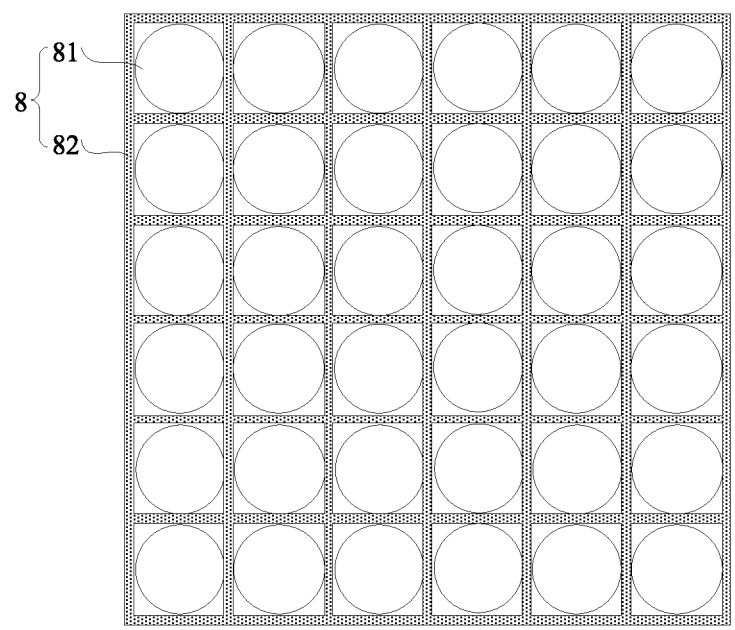
FIG. 4 is a schematic diagram of a structure of a solid-state liquid crystal film according to an embodiment of the present disclosure.
Figure 5:
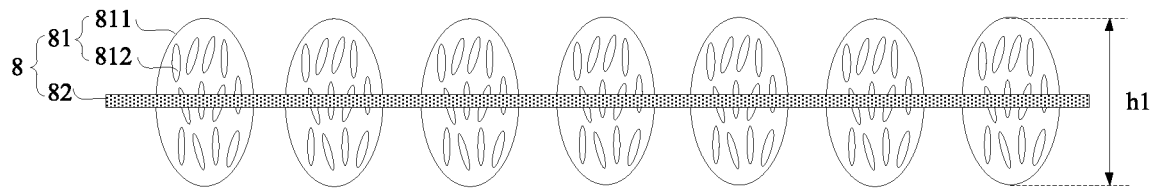
FIG. 5 is a side view of FIG. 4.

FIG. 4 is a schematic diagram of a structure of a solid-state liquid crystal film according to an embodiment of the present disclosure, and FIG. 5 is a side view of FIG. 4. In an example, as shown in FIG. 4 and FIG. 5, each solid-state liquid crystal film 8 includes a plurality of liquid crystal capsules 81 and a bio-grid 82. Each liquid crystal capsule 81 includes an alignment coating 811, and a plurality of liquid crystal molecules 812 coated with the alignment coating 811. The plurality of liquid crystal capsules 81 is fixed to the bio-grid 82.

In the existing liquid crystal phase shifting device, liquid crystals in the liquid crystal phase shifting device are liquid-state liquid crystals, and in order to achieve alignment of the liquid-state liquid crystals, an alignment film is usually provided on each of the two substrates. However, the liquid crystal phase shifting device has a large box thickness, and the liquid-state liquid crystals have a poor thickness uniformity. Therefore, when the alignment film aligns the liquid-state liquid crystals, there will be different alignment effects on the liquid crystal molecules in the liquid-state liquid crystals with different thicknesses, resulting in a poor alignment uniformity. In this embodiment of the present disclosure, each liquid crystal capsule 81 included in the solid-state liquid crystal film 8 includes an alignment coating 811 for aligning the liquid crystal molecules 812. Therefore, the liquid crystal capsule 81 has a self-alignment characteristic, and thus each liquid crystal capsule 81 can individually align the liquid crystal molecules 812 in the liquid crystal capsule 81 by using its own alignment coating 811, greatly improving an alignment uniformity of the liquid crystal molecules 812 and thus improving an accuracy in the phase shifting of the microwave signal.

In addition, each liquid crystal capsule 81 is fixed to the bio-grid 82, so that a position and an orientation of the liquid crystal capsule 81 can be fixed. This can allow the plurality of liquid crystal capsules 81 to have the same orientation, achieving a thickness uniformity for the formed solid-state liquid crystal film 8. Additionally, when the liquid crystal phase shifting device is bent and folded, this can prevent the liquid crystal capsule 81 from irregularly moving in the liquid crystal phase shifting device. In this way, not only a good thickness uniformity of the solid-state liquid crystal film 8 when the liquid crystal phase shifting device is bent and folded can be achieved, but also the position of the liquid crystal capsule 81 can be prevented from shifting, further improving the accuracy of the phase shifting of the microwave signal by the liquid crystal capsule 81.

The bio-grid 82 may be a braid grid, a hollow diamond grid, a mesh grid, a tile-shaped grid, a diagonal brick-shaped grid, a zigzag-shaped grid, a wave-shaped grid or a solid diamond grid. In practical applications, the embodiments of the present disclosure do not limit a type of the bio-grid 82, as long as the type of the bio-grid 82 matches a shape of the liquid crystal capsule 81.

Figure 6:
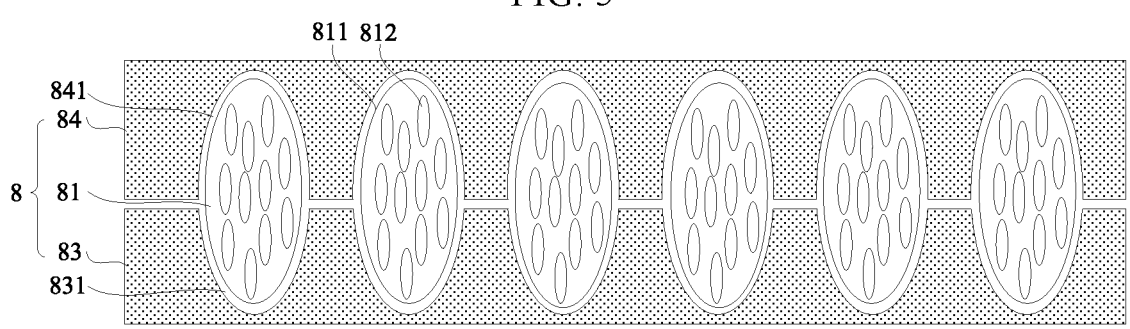
FIG. 6 is a schematic diagram of another structure of a solid-state liquid crystal film according to an embodiment of the present disclosure.

FIG. 6 is a schematic diagram of another structure of a solid-state liquid crystal film according to an embodiment of the present disclosure. In an example, as shown in FIG. 6, each solid-state liquid crystal film 8 includes a plurality of liquid crystal capsules 81, and a first inorganic layer 83 and a second inorganic layer 84 that are opposite to each other. Each liquid crystal capsule 81 includes an alignment coating 811 and a plurality of liquid crystal molecules 812 coated with the alignment coating 811. A surface of the first inorganic layer 83 facing towards the second inorganic layer 84 is provided with a plurality of first recesses 831, and a surface of the second inorganic layer 84 facing towards the first inorganic layer 83 is provided with a plurality of second recesses 841. The liquid crystal capsule 81 is fixed between the first recess 831 and the second recess 841.

With such setting, on one hand, each liquid crystal capsule 81 individually aligns the liquid crystal molecule 812 included in the liquid crystal capsule 81 by using its own alignment coating 811, greatly improving the alignment uniformity of the liquid crystal molecules 812. On the other hand, each liquid crystal capsule 81 is arranged between the first recess 831 and the second recess 841, so that the position and the orientation of the liquid crystal capsule 81 can be fixed. Even if the liquid crystal phase shifting device is bent and folded, the solid-state liquid crystal film 8 can still have a good thickness uniformity, and a high accuracy in the phase shifting of the microwave signal can be achieved. Moreover, an outer surface of the first inorganic layer 83 and an outer surface of the second inorganic layer 84 are both flat surfaces. In this way, not only a good thickness uniformity of the solid-state liquid crystal film 8 can be achieved, but also a good thickness uniformity of all the solid-state liquid crystals 5 can be achieved in a case in which the solid-state liquid crystals 5 include a plurality of solid-state liquid crystal films 8 that is stacked.

Figure 7:
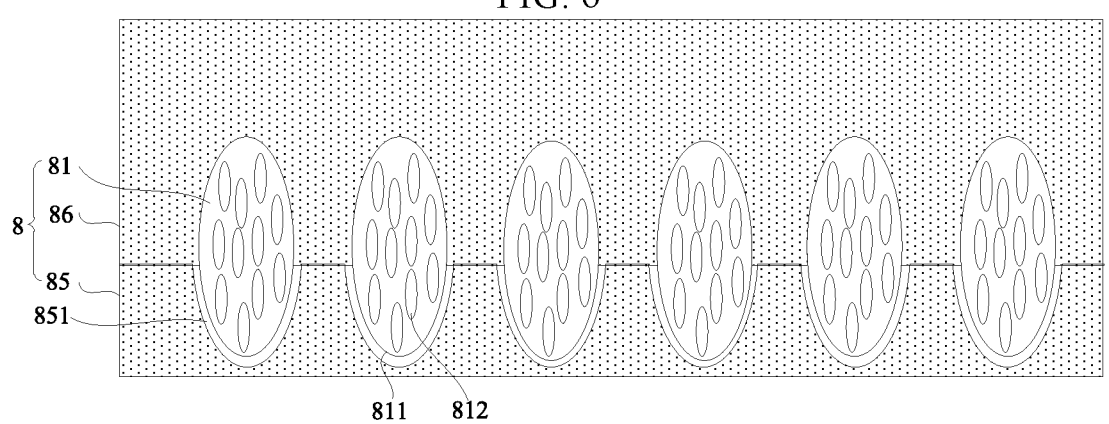
FIG. 7 is a schematic diagram of still another structure of a solid-state liquid crystal film according to an embodiment of the present disclosure.

FIG. 7 is a schematic diagram of still another structure of a solid-state liquid crystal film according to an embodiment of the present disclosure. In an example, as shown in FIG. 7, each solid-state liquid crystal film 8 includes a plurality of liquid crystal capsules 81, a third inorganic layer 85, and a fourth organic layer 86. Each liquid crystal capsule 81 includes an alignment coating 811 and a plurality of liquid crystal molecules 812 coated with the alignment coating 811. The third inorganic layer 85 is provided with a plurality of third recesses 851, and the liquid crystal capsules 81 are fixed into the third recesses 851. The fourth organic layer 86 covers the plurality of liquid crystal capsules 81.

It should be noted that, the solid-state liquid crystal film 8 shown in FIG. 7 differs from a structure of solid-state liquid crystal film 8 shown in FIG. 6 in that the fourth organic layer 86 included in the solid-state liquid crystal film 8 shown in FIG. 7 is an organic film layer. In the manufacturing process of the solid-state liquid crystal film 8, after the liquid crystal capsule 81 is placed in the third recess 851 of the third inorganic layer 85, the liquid crystal capsule 81 may be directly coated with an organic film layer, i.e., the fourth organic layer 86, by coating or the like process. In this case, the fourth organic layer 86 is in direct contact with the outer surface of the liquid crystal capsule 81.

With such setting, on one hand, based on the self-alignment characteristic of the liquid crystal capsule 81, the alignment uniformity of the liquid crystal molecules 812 can be improved. on the other hand, the position and the orientation of each liquid crystal capsule 81 are fixed by the third recess 851, so that a good thickness uniformity of the solid-state liquid crystal film 8 can be achieved when the liquid crystal phase shifting device is bent and folded, and a high accuracy in the phase shifting of the microwave signal can be achieved. Additionally, since the organic layer has a large thickness, the liquid crystal capsule 81 is covered by the fourth organic layer 86, and the fourth organic layer 86 can completely cover the liquid crystal capsule 81 and form a flat surface. In a case in which the solid-state liquid crystals 5 include a plurality of solid-state liquid crystal films 8, all the solid-state liquid crystals 5 can have a good thickness uniformity.

Figure 8:
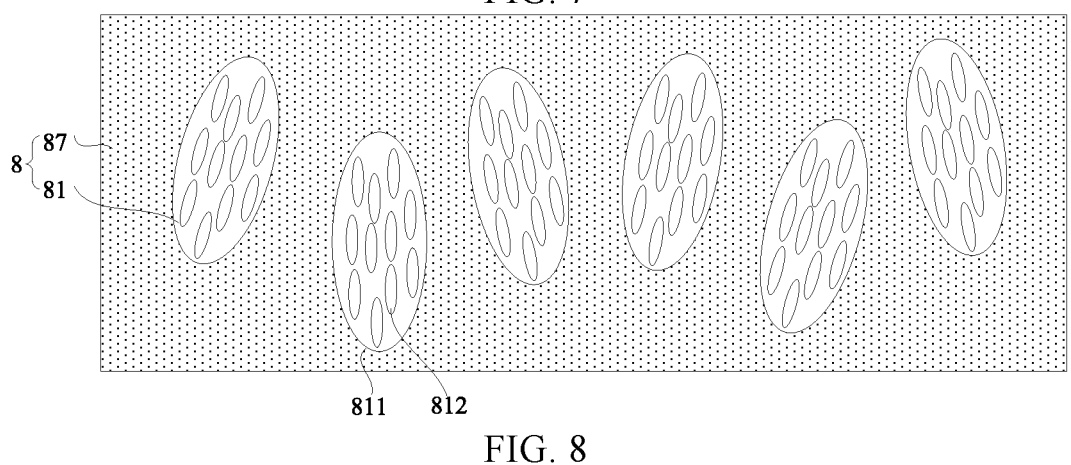
FIG. 8 is a schematic diagram of yet another structure of a solid-state liquid crystal film according to an embodiment of the present disclosure.

FIG. 8 is a schematic diagram of yet another structure of a solid-state liquid crystal film according to an embodiment of the present disclosure. In an example, as shown in FIG. 8, each solid-state liquid crystal film 8 includes a plurality of liquid crystal capsules 81 and a fifth organic layer 87. Each liquid crystal capsule 81 includes an alignment coating 811, and a plurality of liquid crystal molecules 812 coated by with alignment coating 811. The plurality of liquid crystal capsules 81 are distributed in the fifth organic layer 87.

With such setting, since the organic layer has a large thickness, even if the plurality of liquid crystal capsules 81 is distributed in the fifth organic layer 87, the fifth organic layer 87 can still have a flat outer surface, achieving a good thickness uniformity of all the entire solid-state liquid crystals 5.

In addition, when the solid-state liquid crystal film 8 adopts the structure described above, in the manufacturing process, it is only needed to uniformly mix the plurality of liquid crystal capsules 81 with a liquid organic material, and then form the fifth organic layer 87, in which the plurality of liquid crystal capsules 81 is distributed, by a process such as coating. Such a manufacturing process is simple and easy to operate, and thus has strong implementability.

In an example, the liquid crystal capsule 81 may have an ellipsoidal shape, a spherical shape, a cylindrical shape or other shape, which will not be limited in the present disclosure. With further reference to FIG. 5, usually, a height h1 of the liquid crystal capsule 81 is within a range from 2 μm to 30 μm. In practical applications, the height of the liquid crystal capsule 81 may be determined by its process.

In addition, it should be noted that solid-state liquid crystals 5 may include only one solid-state liquid crystal film 8 or a plurality of solid-state liquid crystal films 8. A number of the solid-state liquid crystal films may be determined based on a required thickness for the solid-state liquid crystals 5 and a thickness of each solid-state liquid crystal film 8. In an example, a total thickness of the solid-state liquid crystals 5 may be set to be greater than or equal to 3 μm and smaller than or equal to 200 μm. When the total thickness of the solid-state liquid crystals 5 is set to be greater than or equal to 3 μm, the solid-state liquid crystals 5 can be prevented from being too thin, so that there may be a sufficient number of liquid crystal molecules 812 in the solid-state liquid crystals 5, and thus a good accuracy in the phase shifting of the microwave signal by the liquid crystal molecule 812 can be achieved. When the total thickness of the solid-state liquid crystals 5 is set to be smaller than or equal to 200 μm, the solid-state liquid crystals 5 can be prevented from being too thick, so that a good rotation uniformity of the liquid crystal molecules 812 in the electric field can be achieved, and thus a good accuracy in the phase shifting of the microwave signal by the liquid crystal molecule 812 can be achieved.

Figure 9:
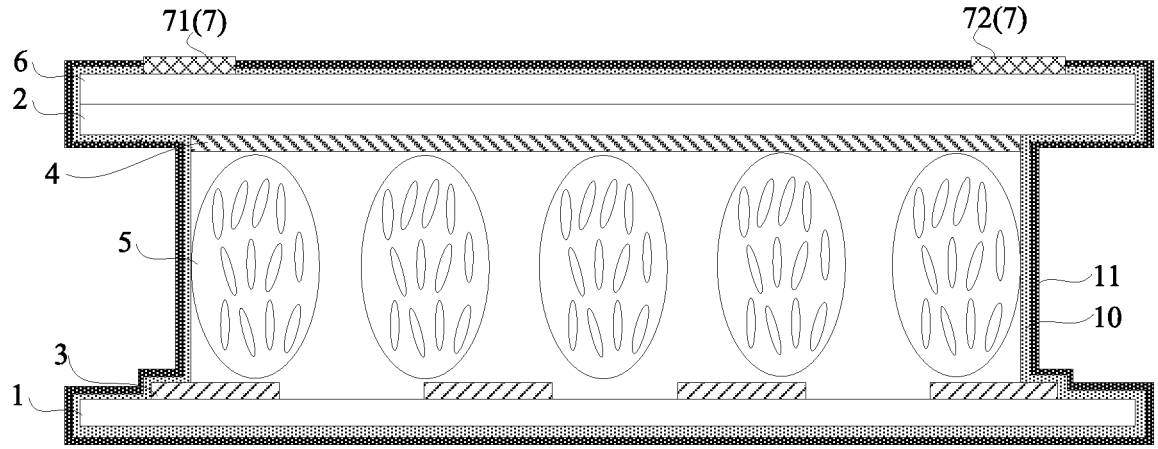
FIG. 9 is a schematic structural diagram showing a reinforced flexible protective film and a coating layer according to an embodiment of the present disclosure.

Further, the liquid crystal phase shifting device may further include a reinforced flexible protective film and/or a coating layer. FIG. 9 is a schematic structural diagram showing a reinforced flexible protective film and a coating layer according to an embodiment of the present disclosure. As shown in FIG. 9, the reinforced flexible protective film 10 may be provided on a surface of the first flexible substrate 1 facing away from the second flexible substrate 2, on a part of a surface of the third flexible substrate 6 facing away from the second flexible substrate 2 where no feeder line 7 is arranged, and between the first flexible substrate 1 and the second flexible substrate 2. The coating layer 11 may be provided on a surface of the first flexible substrate 1 facing away from the second flexible substrate 2, on a part of a surface of the third flexible substrate 6 facing away from the second flexible substrate 2 where no feeder line 7 is arranged, and between the first flexible substrate 1 and the second flexible substrate 2.

When the liquid crystal phase shifting device is folded and bent, the first flexible substrate 1, the second flexible substrate 2, and/or the third flexible substrate 6 may be broken, affecting a service life of the liquid crystal phase shifting device. With the reinforced flexible protective film 10, the flexible substrate can be reinforced by the reinforced flexible protective film 10, decreasing a possibility that the flexible substrate is broken when being bent. Therefore, the service life of the liquid crystal phase shifting device can be increased.

When the liquid crystal phase shifting device is provided with the coating layer 11, the liquid crystal phase shifting device can be concealed by the coating layer 11, so that the liquid crystal phase shifting device is not visible to the human eye. In this way, the liquid crystal phase shifting device can be better concealed, being better applied in military and other fields.

It should be noted that in a case in which the liquid crystal phase shifting device includes both the reinforced flexible protective film 10 and the coating layer 11, the coating layer 11 is arranged on an outer surface of the reinforced flexible protective film 10.

In an example, the coating layer 11 may be a reflective layer. In this case, light emitted from the human eye will be completely reflected by the coating layer 11, making an internal structure of the coating layer 11 invisible to the human eye.

Figure 10:
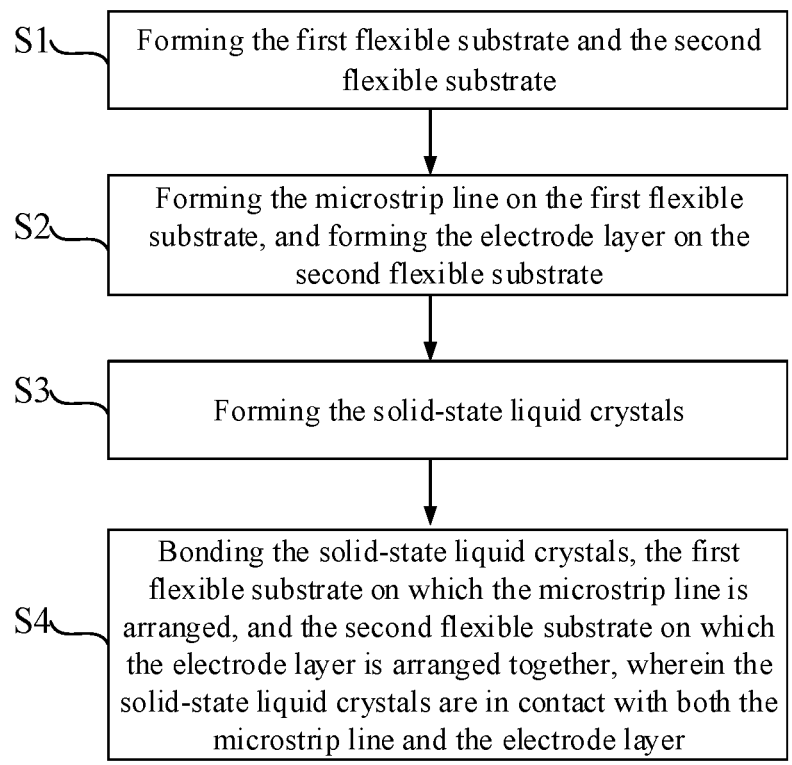
FIG. 10 is a flowchart of a manufacturing method for a liquid crystal phase shifting device according to an embodiment of the present disclosure.

The embodiments of the present disclosure further provide a manufacturing method for a liquid crystal phase shifting device, and the manufacturing method is applied to the liquid crystal phase shifting device described above. FIG. 10 is a flowchart of a manufacturing method for a liquid crystal phase shifting device according to an embodiment of the present disclosure. In combination with FIG. 1 and FIG. 2 and as shown in FIG. 10, the manufacturing method for the liquid crystal phase shifting device includes following steps.

At step S1, a first flexible substrate 1 and a second flexible substrate 2 are formed.

At step S2, a microstrip line 3 is formed on the first flexible substrate 1, and an electrode layer 4 is formed on the second flexible substrate 2.

At step S3, solid-state liquid crystals 5 are formed.

At step S4, the solid-state liquid crystals 5, the first flexible substrate 1 on which the microstrip line 3 is formed, and the second flexible substrate 2 on which the electrode layer 4 is formed are bonded together, and the solid-state liquid crystals 5 are in contact with both the microstrip line 3 and the electrode layer 4.

With the manufacturing method for the liquid crystal phase shifting device according to this embodiment of the present disclosure, the two substrates of the liquid crystal phase shifting device are both flexible substrates. Therefore, the liquid crystal phase shifting device has a low rigidity and is foldable and bendable, which can not only decrease the volume but also leads to the better curved surface applications. In addition, a thickness and a weight of an overall liquid crystal phase shifting device can be decreased, greatly alleviating a restriction on the application of the liquid crystal phase shifting device caused by the excessively large thickness and weight. Therefore, with the manufacturing method for the liquid crystal phase shifting device according to this embodiment of the present disclosure, applications of the liquid crystal phase shifting device can be greatly increased.

It should be noted that, taking the first flexible substrate 1 as an example, a process of forming the first flexible substrate 1 includes: providing a rigid substrate, such as a glass substrate, a silicon-base substrate, a hard resin substrate, a metal sheet substrate and the like; coating the rigid substrate with a flexible material, such as polyimide (PI), polycarbonate (PC), polyethersulfone (PES), polyethylene terephthalate (PET), polyethylene naphthalate (PEN), polyarylate (PAR) or glass fiber reinforced plastic (FRP); and drying and forming a film to form the first flexible substrate 1. After the microstrip line 3 is formed on the first flexible substrate 1, the first flexible substrate 1 is peeled off from the rigid substrate by a process such as later ablation. A formation process and a peeling process of the second flexible substrate 2 are similar to those of the first flexible substrate 1 and will not be repeated herein.

Further, the manufacturing method for the liquid crystal phase shifting device further includes following steps.

A third flexible substrate 6 is provided.

A feeder line 7 is formed on the third flexible substrate 6.

The third flexible substrate 6, on which the feeder line 7 is formed, is bonded to the second flexible substrate 2 on which the electrode layer 4 is formed, so that the feeder line 7 is located at a side of the third flexible substrate 6 facing away from the second flexible substrate 2.

A formation process and a peeling process of the third flexible substrate 6 are similar to those of the first flexible substrate 1 and will not be repeated herein.

It should be noted that, in the embodiments of the present disclosure, the order of forming the first flexible substrate 1, the second flexible substrate 2, and the third flexible substrate 6 is not limited, the order of forming the microstrip line 3 on the first flexible substrate 1, forming the electrode layer 4 on the second flexible substrate 2, and forming the feeder line 7 on the third flexible substrate 6 is not limited, and the order of bonding the first flexible substrate1, the second flexible substrate2, and the third flexible substrate 6 is not limited.

In an example, first, the third flexible substrate 6, on which the feeder line 7 is formed, is bonded to the second flexible substrate 2 on which the electrode layer 4 is formed. Then, the second flexible substrate 2, on which the electrode layer 4 is formed, is bonded to the first flexible substrate 2 on which the microstrip line 3 is formed. In one embodiment, first, the second flexible substrate 2, on which the electrode layer 4 is formed, is bonded to the first flexible substrate 1 on which the microstrip line 3 is formed. Then, the third flexible substrate 6 on which the feeder line 7 is formed, is bonded to the second flexible substrate 2 on which the electrode layer 4 is formed.

In an example, a process of forming the solid-state liquid crystals 5 includes: forming at least one solid-state liquid crystal film 8. The solid-state liquid crystal film 8 may be bonded to the first flexible substrate 1, on which the microstrip line 3 is formed, by printing, coating, spray printing, or the like.

In an example, with reference to FIG. 4 and FIG. 5, a process of forming a solid-state liquid crystal film 8 may include following steps.

A plurality of liquid crystal capsules 81 is formed, and each liquid crystal capsule 81 includes an alignment coating 811, and a plurality of liquid crystal molecules 812 coated with the alignment coating 811.

A bio-grid 82 is provided to fix the plurality of liquid crystal capsules 81 to the bio-grid 82.

A process of forming the liquid crystal capsules 81 includes: mixing the liquid methyl molecules 812 with polymethyl methacrylate (PMMA), dimethyl carbonate (DMC), ethyl acetate, dichloromethane, acetone, or the like, and with polyvinyl alcohol (PVA) for multiple times, to form a mixture; and forming the liquid crystal capsules 81 by water washing and concentration. In one embodiment, the process of forming the liquid crystal capsule 81 includes: mixing the liquid methyl molecules 812 with polymethyl methacrylate (PMMA), dimethyl carbonate (DMC), ethyl acetate, dichloromethane, acetone, or the like, and with polyvinyl alcohol (PVA) for multiple times, to form a mixture; adding surfactant to the mixture; and forming the liquid crystal capsules 81 by solvent evaporation. In one embodiment, the liquid crystal capsules 81 may be formed by adding gelatin or arabic gum to the liquid crystal molecules 812 and adding polyethylene sodium benzenesulfonate or urea-formaldehyde and polymer and by water washing and sedimentation.

The process of fixing the plurality of liquid crystal capsules 81 to the bio-grid 82 includes may include mixing the liquid crystal capsules 81 in liquid, and fixing the liquid crystal capsules 81 to the bio-grid 82 by flow or diffusion.

Fixing the plurality of liquid crystal capsules 81 to the bio-grid 82, on the one hand, can achieve a good thickness uniformity of the formed solid-state liquid crystal film 8, and on the other hand, can prevent the liquid crystal capsules 81 from irregularly moving in the liquid crystal phase shifting device when the liquid crystal phase shifting device is bent and folded. In this way, not only a good thickness uniformity of the solid-state liquid crystal film 8 can be achieved when the liquid crystal phase shifting device is bent and folded, but also a high accuracy in the phase shifting of the microwave signal by the liquid crystal capsule 81 can be achieved.

In an example, in combination with FIG. 6, the process of forming a solid-state liquid crystal film 8 may include following steps.

A plurality of liquid crystal capsules 81 is formed, and each liquid crystal capsule 81 includes an alignment coating 811, and a plurality of liquid crystal molecules 812 coated with the alignment coating 811.

A first inorganic layer 83 provided with a plurality of first recesses 831 is formed.

A second inorganic layer 84 provided with a plurality of second recesses 841 is formed.

The plurality of liquid crystal capsules 81 is placed in the plurality of first recesses 831, and the second inorganic layer 84 covers the plurality of liquid crystal capsules 81 to fix the liquid crystal capsules 81 between the plurality of first recesses 831 and the plurality of second recesses 841.

A process of forming the first inorganic layer 83 provided with a plurality of first recesses 831 includes: forming the first inorganic layer 83 by an inorganic material, and forming the plurality of first recesses 831 by hollowing out or the like manner. A process of forming the second inorganic layer 84 including a plurality of second recesses 841 includes: forming the second inorganic layer 84 by an inorganic material, and forming the plurality of second recesses 841 by hollowing out or the like manner.

Each liquid crystal capsule 81 is arranged between the first recess 831 and the second recess 841, so that a position and an orientation of the liquid crystal capsules 81 can be fixed. Even if the liquid crystal phase shifting device is bent and folded, the solid-state liquid crystal film 8 can still have a good thickness uniformity, and a high accuracy in the phase shifting of the microwave signal can be achieved. In addition, an outer surface of the first inorganic layer 83 and an outer surface of the second inorganic layer 84 are both flat surfaces. Therefore, not only a good thickness uniformity of the solid-state liquid crystal film 8 can be achieved, but also a good thickness uniformity of all the solid-state liquid crystals 5 can be achieved in a case in which the solid-state liquid crystals 5 include a plurality of solid-state liquid crystal films 8 that are stacked.

In an example, with reference to FIG. 7, a process of forming a solid-state liquid crystal film 8 may include following steps.

A plurality of liquid crystal capsules 81 is formed, and each liquid crystal capsule 81 includes an alignment coating 811, and a plurality of liquid crystal molecules 812 coated with the alignment coating 811.

A third inorganic layer 85 provided with a plurality of third recesses 851 is formed.

The plurality of liquid crystal capsules 81 is placed in the plurality of third recesses 851.

A fourth organic layer 86 is formed on the plurality of liquid crystal capsules 81.

A position and an orientation of each liquid crystal capsule 81 is determined by the plurality of third recesses 851. Therefore, when the liquid crystal phase shifting device is bent and folded, the solid-state liquid crystal film 8 can have a good thickness uniformity, and a high accuracy in the phase shifting of the microwave signal can be achieved. In addition, since the organic layer has a large thickness, the liquid crystal capsule 81 is covered by the fourth organic layer 86, and the fourth organic layer 86 can completely cover the liquid crystal capsule 81 and form a flat surface. In a case in which the solid-state liquid crystals 5 include a plurality of solid-state liquid crystal films 8, the entire solid-state liquid crystals 5 can have a good thickness uniformity.

In an example, in combination with FIG. 8, a process of forming a solid-state liquid crystal film 8 may include following steps.

A plurality of liquid crystal capsules 81 is formed, and each liquid crystal capsule 81 includes an alignment coating 811, and a plurality of liquid crystal molecules 812 coated with the alignment coating 811.

The plurality of liquid crystal capsules is placed in a liquid organic material, and the plurality of liquid crystal capsules and the liquid organic material are evenly mixed. Then, a fifth organic layer 87 is formed by a coating process, and the plurality of liquid crystal capsules 81 is distributed in the fifth organic layer 87.

Since the organic layer has a large thickness, even if the plurality of liquid crystal capsules 81 is distributed in the fifth organic layer 87, the fifth organic layer 87 can still have a flat outer surface, achieving a good thickness uniformity of the entire solid-state liquid crystals 5. Moreover, such a manufacturing process is simple and easy to operate, and thus has strong implementability.

Figure 11:
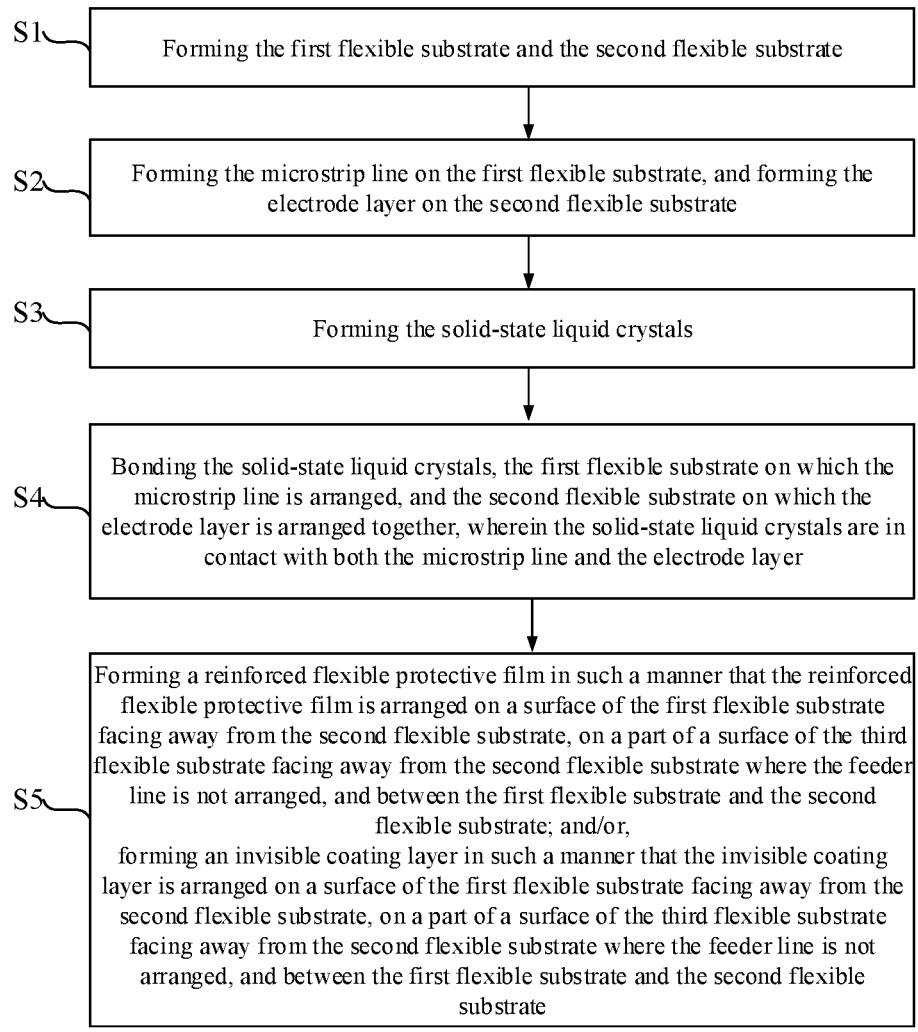
FIG. 11 is another flowchart of a manufacturing method for a liquid crystal phase shifting device according to an embodiment of the present disclosure.

FIG. 11 is another flowchart of a manufacturing method for a liquid crystal phase shifting device according to an embodiment of the present disclosure. Further, in combination with FIG. 9 and with refer to FIG. 11, after the third flexible substrate 6, on which the feeder line 7 is formed, is bonded to the second flexible substrate 2 on which the electrode layer 4 is formed, the manufacturing method for the liquid crystal phase shifting device further includes a following step.

At step S5, a reinforced flexible protective film 10 is formed on a surface of the first flexible substrate 1 facing away from the second flexible substrate 2, on a part of a surface of the third flexible substrate 6 facing away from the second flexible substrate 2 where no feeder line 7 is arranged, and between the first flexible substrate 1 and the second flexible substrate 2; and/or, a coating layer 11 is formed on a surface of the first flexible substrate 1 facing away from the second flexible substrate 2, on a part of a surface of the third flexible substrate 6 facing away from the second flexible substrate 2 where no feeder line 7 is arranged, and between the first flexible substrate 1 and the second flexible substrate 2.

The reinforced flexible protective film 10 and/or the coating layer 11 may be formed by coating, spray printing, silk-screen printing and the like.

When the liquid crystal phase shifting device is folded and bent, the first flexible substrate 1, the second flexible substrate 2, and/or the third flexible substrate 6 may be broken, affecting a service life of the liquid crystal phase shifting device. With the reinforced flexible protective film 10, the flexible substrate can be reinforced by the reinforced flexible protective film 10, decreasing a possibility that the flexible substrate is broken when being bent. Therefore, the service life of the liquid crystal phase shifting device can be increased.

When the liquid crystal phase shifting device is provided with the coating layer 11, the liquid crystal phase shifting device can be concealed by the coating layer 11, so that the liquid crystal phase shifting device is not visible to the human eye. In this way, the liquid crystal phase shifting device can be better concealed, being better applied in military and other fields.

It should be noted that in the embodiments described above, the manner for peeling the flexible substrate off from the rigid substrate, the manner for bonding the solid-state liquid crystal film 8 to the first flexible substrate 1, and the manner for forming the reinforced flexible protective film 10 and/or the coating layer 11 are merely for illustration, and do not limit the present disclosure. It can be understood that, in the actual manufacturing processes, other manners can also be adopted in the manufacturing.

Figure 12:
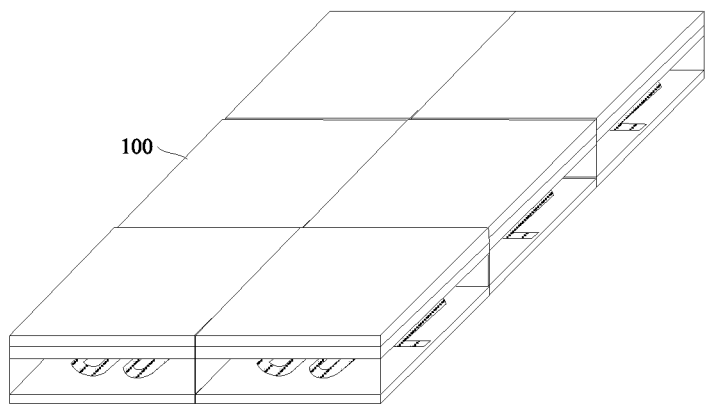
FIG. 12 is a schematic diagram of a structure of a liquid crystal phase shifter according to an embodiment of the present disclosure.

The embodiments of the present disclosure further provide a liquid crystal phase shifter. FIG. 12 is a schematic diagram of a structure of a liquid crystal phase shifter according to an embodiment of the present disclosure. As shown in FIG. 12, the liquid crystal phase shifter includes a plurality of liquid crystal phase shifting devices 100 described above that is arranged in a matrix.

Since the liquid crystal phase shifter according to this embodiment of the present disclosure includes the liquid crystal phase shifting device 100 described above, the liquid crystal phase shifter has characteristics such as a small rigidity, being foldable and bendable, a small thickness and a small weight, leading to the better curved surface applications. This can break a bottleneck of the existing liquid crystal phase shifting device in the curved surface applications. In addition, this can greatly alleviate a restriction on the application of the liquid crystal phase shifting device caused by the excessively large thickness and weight.

The embodiments of the present disclosure further provide an antenna, which includes the liquid crystal phase shifter described above.

Since the antenna according to this embodiment of the present disclosure includes the liquid crystal phase shifter described above, the antenna has characteristics such as a small rigidity, being foldable and bendable, a small thickness and a small weight, leading to the better curved surface applications. For example, the antenna can be bonded to a communication device, improving concealment of the antenna.

The above-described embodiments are merely embodiments of the present disclosure and are not intended to limit the present disclosure. Any modifications, equivalent substitutions and improvements made within the principle of the present disclosure shall fall into the protection scope of the present disclosure.

What is claimed is:

1. A liquid crystal phase shifting device, comprising:
   a first flexible substrate and a second flexible substrate that are opposite to each other;
   a microstrip line arranged on a side of the first flexible substrate facing towards the second flexible substrate;
   an electrode layer arranged on a side of the second flexible substrate facing towards the first flexible substrate; and
   solid-state liquid crystals arranged between the microstrip line and the electrode layer,
   wherein the solid-state liquid crystals comprise at least one solid-state liquid crystal film, and each of the at least one solid-state liquid crystal film comprises a plurality of liquid crystal capsules, and each of the plurality of liquid crystal capsules comprises an alignment coating and a plurality of liquid crystal molecules coated with the alignment coating.

2. The liquid crystal phase shifting device according to claim 1, further comprising:
   a third flexible substrate arranged at a side of the second flexible substrate facing away from the first flexible substrate; and
   a feeder line arranged at a side of the third flexible substrate facing away from the second flexible substrate.

3. The liquid crystal phase shifting device according to claim 1, wherein each of the solid-state liquid crystals has a thickness that is greater than or equal to 3 μm and smaller than or equal to 200 μm.

4. The liquid crystal phase shifting device according to claim 2, wherein the liquid crystal phase shifting device further comprises a reinforced flexible protective film and/or a coating layer;
   the reinforced flexible protective film is arranged on a surface of the first flexible substrate facing away from the second flexible substrate, on a part of a surface of the third flexible substrate facing away from the second flexible substrate where the feeder line is not arranged, and between the first flexible substrate and the second flexible substrate; and/or,
   the coating layer is arranged on a surface of the first flexible substrate facing away from the second flexible substrate, on a part of a surface of the third flexible substrate facing away from the second flexible substrate where the feeder line is not arranged, and between the first flexible substrate and the second flexible substrate.

5. The liquid crystal phase shifting device according to claim 4, wherein the coating layer is a reflective layer.

6. A manufacturing method for a liquid crystal phase shifting device, wherein the manufacturing method is applied to the liquid crystal phase shifting device according to claim 1, and the manufacturing method comprises steps of:
   forming the first flexible substrate and the second flexible substrate;
   forming the microstrip line on the first flexible substrate, and forming the electrode layer on the second flexible substrate;
   forming the solid-state liquid crystals; and
   bonding the solid-state liquid crystals, the first flexible substrate on which the microstrip line is arranged, and the second flexible substrate on which the electrode layer is arranged together, wherein the solid-state liquid crystals are in contact with both the microstrip line and the electrode layer,
   wherein said forming the solid-state liquid crystals comprises forming at least one solid-state liquid crystal film, and forming one of the at least one solid-state liquid crystal film comprises:
      forming a plurality of liquid crystal capsules, each of which comprises an alignment coating and a plurality of liquid crystal molecules coated with the alignment coating.

7. The manufacturing method for the liquid crystal phase shifting device according to claim 6, further comprising:
   providing a third flexible substrate;
   forming a feeder line on the third flexible substrate; and
   bonding the third flexible substrate on which a feeder line is arranged to the second flexible substrate on which the electrode layer is arranged, in such a manner that the feeder line is located at a side of the third flexible substrate facing away from the second flexible substrate.

8. The manufacturing method for the liquid crystal phase shifting device according to claim 7, further comprising, after said bonding the third flexible substrate on which a feeder line is arranged to the second flexible substrate on which the electrode layer is arranged:
   forming a reinforced flexible protective film in such a manner that the reinforced flexible protective film is arranged on a surface of the first flexible substrate facing away from the second flexible substrate, on a part of a surface of the third flexible substrate facing away from the second flexible substrate where the feeder line is not arranged, and between the first flexible substrate and the second flexible substrate; and/or,
   forming a coating layer in such a manner that the coating layer is arranged on a surface of the first flexible substrate facing away from the second flexible substrate, on a part of a surface of the third flexible substrate facing away from the second flexible substrate where the feeder line is not arranged, and between the first flexible substrate and the second flexible substrate.

9. The liquid crystal phase shifting device according to claim 1, wherein each of the at least one solid-state liquid crystal film further comprises:
   a bio-grid to which the plurality of liquid crystal capsules is fixed.

10. The liquid crystal phase shifting device according to claim 9, wherein the bio-grid is a braid grid, a hollow diamond grid, a mesh grid, a tile-shaped grid, a diagonal brick-shaped grid, a zigzag-shaped grid, a wave-shaped grid or a solid diamond grid.

11. The liquid crystal phase shifting device according to claim 1, wherein each of the at least one solid-state liquid crystal film further comprises:
   a first inorganic layer and a second inorganic layer that are opposite to each other, wherein a surface of the first inorganic layer facing towards the second inorganic layer is provided with a plurality of first recesses, and a surface of the second inorganic layer facing towards the first inorganic layer is provided with a plurality of second recesses; and wherein the plurality of liquid crystal capsules is fixed between the plurality of first recesses and the plurality of second recesses.

12. The liquid crystal phase shifting device according to claim 1, wherein each of the at least one solid-state liquid crystal film further comprises:
   a third inorganic layer provided with a plurality of third recesses, the plurality of liquid crystal capsules being fixed in the plurality of third recesses; and
   a fourth organic layer covering the plurality of liquid crystal capsules.

13. The liquid crystal phase shifting device according to claim 1, wherein each of the at least one solid-state liquid crystal film further comprises:
   a fifth organic layer, the plurality of liquid crystal capsules being distributed in the fifth organic layer.

14. The liquid crystal phase shifting device according to claim 11, wherein the liquid crystal capsule has an ellipsoidal shape, a spherical shape or a cylindrical shape.

15. The manufacturing method for the liquid crystal phase shifting device according to claim 6, wherein said forming the solid-state liquid crystals comprises forming at least one solid-state liquid crystal film;
   wherein forming one of the at least one solid-state liquid crystal film further comprises:
      providing a bio-grid, the plurality of the liquid crystal capsules being fixed to the bio-grid.

16. The manufacturing method for the liquid crystal phase shifting device according to claim 6, wherein said forming the solid-state liquid crystals comprises forming the at least one solid-state liquid crystal film;
   wherein forming one of the at least one solid-state liquid crystal film further comprises:
      forming a first inorganic layer provided with a plurality of first recesses;
      forming a second inorganic layer provided with a plurality of second recesses; and
      placing the plurality of liquid crystal capsules into the plurality of first recesses, and covering the plurality of liquid crystal capsules with the second inorganic layer, in such a manner that the plurality of liquid crystal capsules is fixed between the plurality of first recesses and the plurality of second recesses.

17. The manufacturing method for the liquid crystal phase shifting device according to claim 6, wherein said forming the solid-state liquid crystal comprises forming the at least one solid-state liquid crystal film;
   wherein forming one of the at least one solid-state liquid crystal film further comprises:
      forming a third inorganic layer provided with a plurality of third recesses;
      placing the plurality of liquid crystal capsules into the plurality of third recesses; and
      forming a fourth organic layer on the plurality of liquid crystal capsules.

18. The manufacturing method for the liquid crystal phase shifting device according to claim 6, wherein said forming the solid-state liquid crystal comprises a step of forming the at least one solid-state liquid crystal film;
   wherein forming one of the at least one solid-state liquid crystal film further comprises:
      placing the plurality of liquid crystal capsules into a liquid organic material, evenly mixing the plurality of liquid crystal capsules and the liquid organic material, and forming a fifth organic layer by a coating process, wherein the plurality of liquid crystal capsules is distributed in the fifth organic layer.

19. A liquid crystal phase shifter, comprising a plurality of liquid crystal phase shifting devices that is arranged in a matrix, wherein each of the plurality of liquid crystal phase shifting devices comprises:
   a first flexible substrate and a second flexible substrate that are opposite to each other;
   a microstrip line arranged on a side of the first flexible substrate facing towards the second flexible substrate;
   an electrode layer arranged on a side of the second flexible substrate facing towards the first flexible substrate; and
   solid-state liquid crystal arranged between the microstrip line and the electrode layer,
   wherein the solid-state liquid crystals comprise at least one solid-state liquid crystal film, and each of the at least one solid-state liquid crystal film comprises a plurality of liquid crystal capsules, and each of the plurality of liquid crystal capsules comprises an alignment coating and a plurality of liquid crystal molecules coated with the alignment coating.

20. An antenna, comprising the liquid crystal phase shifter according to claim 19.

* * * * *